(12) United States Patent  
Sung et al.

(10) Patent No.: US 7,901,197 B2
(45) Date of Patent: Mar. 8, 2011

(54) MOLDING DEVICE FOR PRE-SHAPED PLASTIC FILMS

(75) Inventors: Chung-Ting Sung, Kaohsiung (TW); Yen-Chao Lu, Kaohsiung (TW)

(73) Assignee: New Solid International Corp., Qianjin Dist., Kaohsiung (TW)

( * ) Notice: Subject to any disclaimer, the term of this patent is extended or adjusted under 35 U.S.C. 154(b) by 262 days.

(21) Appl. No.: 12/259,526

(22) Filed: Oct. 28, 2008

(65) Prior Publication Data

US 2010/0104683 A1      Apr. 29, 2010

(51) Int. Cl.
*B29C 43/08* (2006.01)
(52) U.S. Cl. .................. 425/193; 425/348 R; 425/360; 425/397; 425/436 RM
(58) Field of Classification Search .................. 425/112, 425/117, 359, 360, 361, 193, 413, 397, 348 R, 425/436 RM, 403.1, 577, 395
See application file for complete search history.

(56) References Cited

U.S. PATENT DOCUMENTS

| 3,956,516 | A | * | 5/1976 | Holt et al. ..................... 426/420 |
| 4,640,671 | A | * | 2/1987 | Wright .......................... 425/149 |
| 4,755,128 | A | * | 7/1988 | Alexander et al. ............ 425/292 |
| 5,980,231 | A | * | 11/1999 | Arends et al. ................. 425/397 |
| 6,042,363 | A | * | 3/2000 | Kikuchi ........................ 425/556 |
| 7,140,863 | B2 | * | 11/2006 | Koppenhofer ................ 425/292 |
| 7,419,462 | B1 | * | 9/2008 | Zelinski ........................ 493/143 |

\* cited by examiner

*Primary Examiner* — Maria Veronica D Ewald
*Assistant Examiner* — Emmanuel S Luk
(74) *Attorney, Agent, or Firm* — Burr & Brown

(57) ABSTRACT

A molding device for pre-shaped plastic films has a body, a platform and a driving shaft. The body can be rotatably mounted in a pre-shape machine and has an annular side surface and a top opening. The platform is detachably mounted in the top opening of the body. The driving shaft is mounted longitudinally through the body, movably extends longitudinally relative to the body and has an end attached securely to the platform to selectively raise the platform to lift a pre-shaped plastic film from the body. Accordingly, the plastic films can easily be separated from the platform, and to manually separate the plastic film from the molding device is unnecessary to prevent the plastic films from being damaged.

6 Claims, 9 Drawing Sheets

MOLDING DEVICE FOR PRE-SHAPED PLASTIC FILMS

BACKGROUND OF THE INVENTION

1. Field of the Invention

The present invention relates to a molding device, and more particularly to a molding device for pre-shaped plastic films to automatically separate a pre-shaped plastic film from the molding device and facilitate remove and avoid yield loss due to personnel scratch.

2. Description of Related Art

Plastic films are widely used for package of diverse products be applied on surfaces of the products and are heated by hot air blowers to shrink and tightly enclose the products.

With reference to FIG. 9, a plastic film applied to a columnar product such as a canned food, stack of optical disks or the like is mostly pre-shaped into a circular shape with an annular flange formed around a top edge of the film. When applying to the columnar product, the plastic film is put around the columnar product with the annular flange being attached on a top of the columnar product. Then, the plastic film is heated and deformed to wrap up the columnar product.

The plastic film is pre-shaped in a molding device and is manually separated and removed from the molding device. In such a manner, the plastic film is unavoidably scratched due to personnel carelessness, and the process of pre-shaping the plastic film may become too tedious and time-consuming, particularly to a large number of plastic films be fabricating.

The present invention therefore provides a molding device for pre-shaped plastic films to obviate or mitigate the aforementioned problems.

SUMMARY OF THE INVENTION

The main objective of the present invention is to provide a molding device for pre-shaped plastic films to automatically separate a pre-shaped plastic film from the molding device and to facilitate remove and avoid yield loss due to personnel scratch.

To achieve the objective, the molding device for pre-shaped plastic films in accordance with present invention comprises a body, a platform and a driving shaft.

The body can be rotatably mounted in a pre-shape machine and has an annular side surface and a top opening.

The platform is detachably mounted in the top opening of the body.

The driving shaft is mounted longitudinally through the body, movably extends longitudinally relative to the body and has a top end attached securely to the platform to selectively raise the platform.

When a plastic film is mounted around the body and pre-shaped into a circular shape with an annular flange formed around a top edge of the film, the platform is raised by operation of a driving shaft to lift the plastic film from the body. Consequently, the plastic film may easily be separated from the platform, and to manually separate the plastic films from the molding device is unnecessary. Therefore, the plastic films can be kept from being damaged and the pre-shaping process is accelerated.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
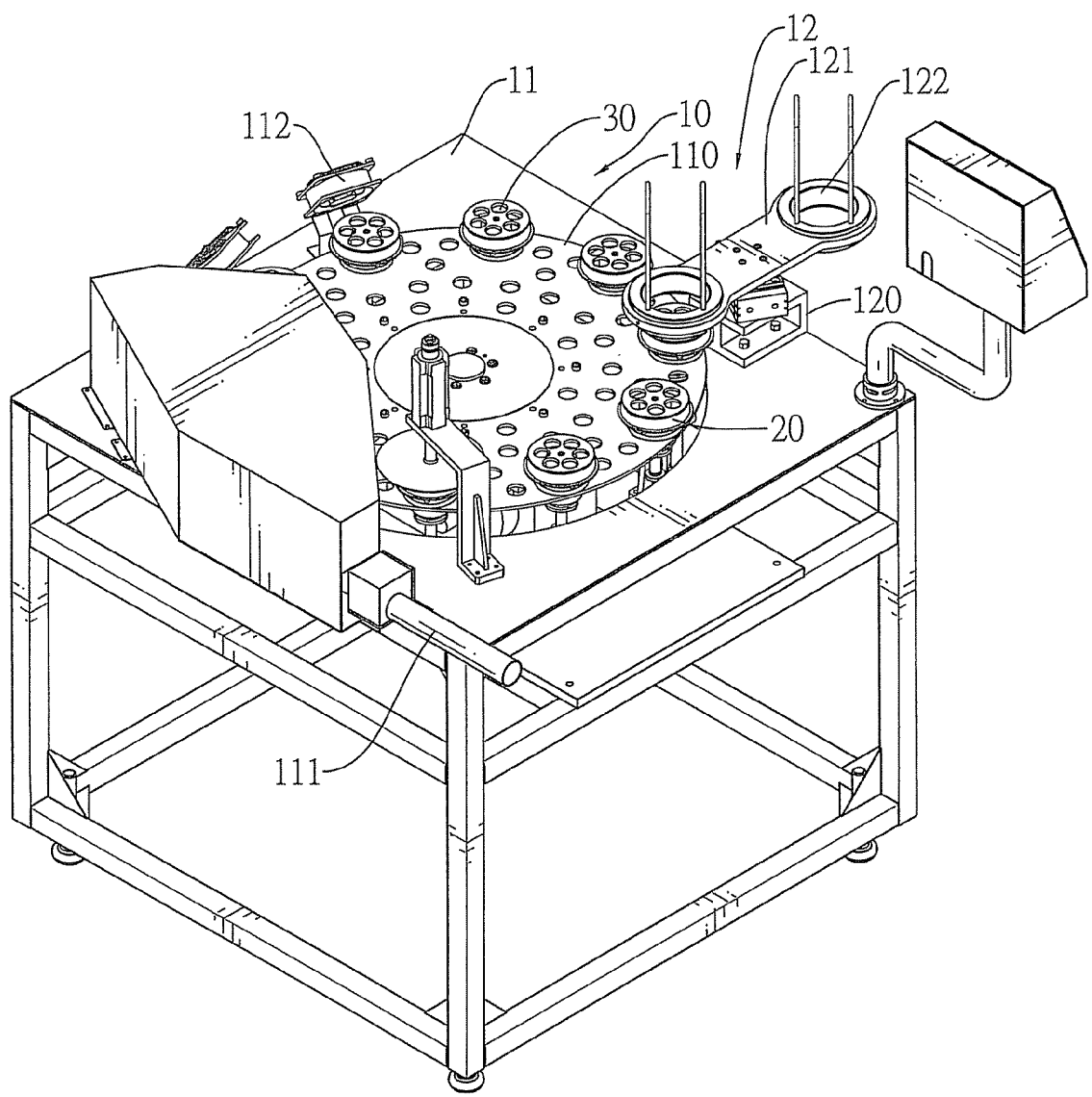
FIG. 1 is an operational perspective view of a molding device in accordance with the present invention mounted in a pre-shape machine.
Figure 2:
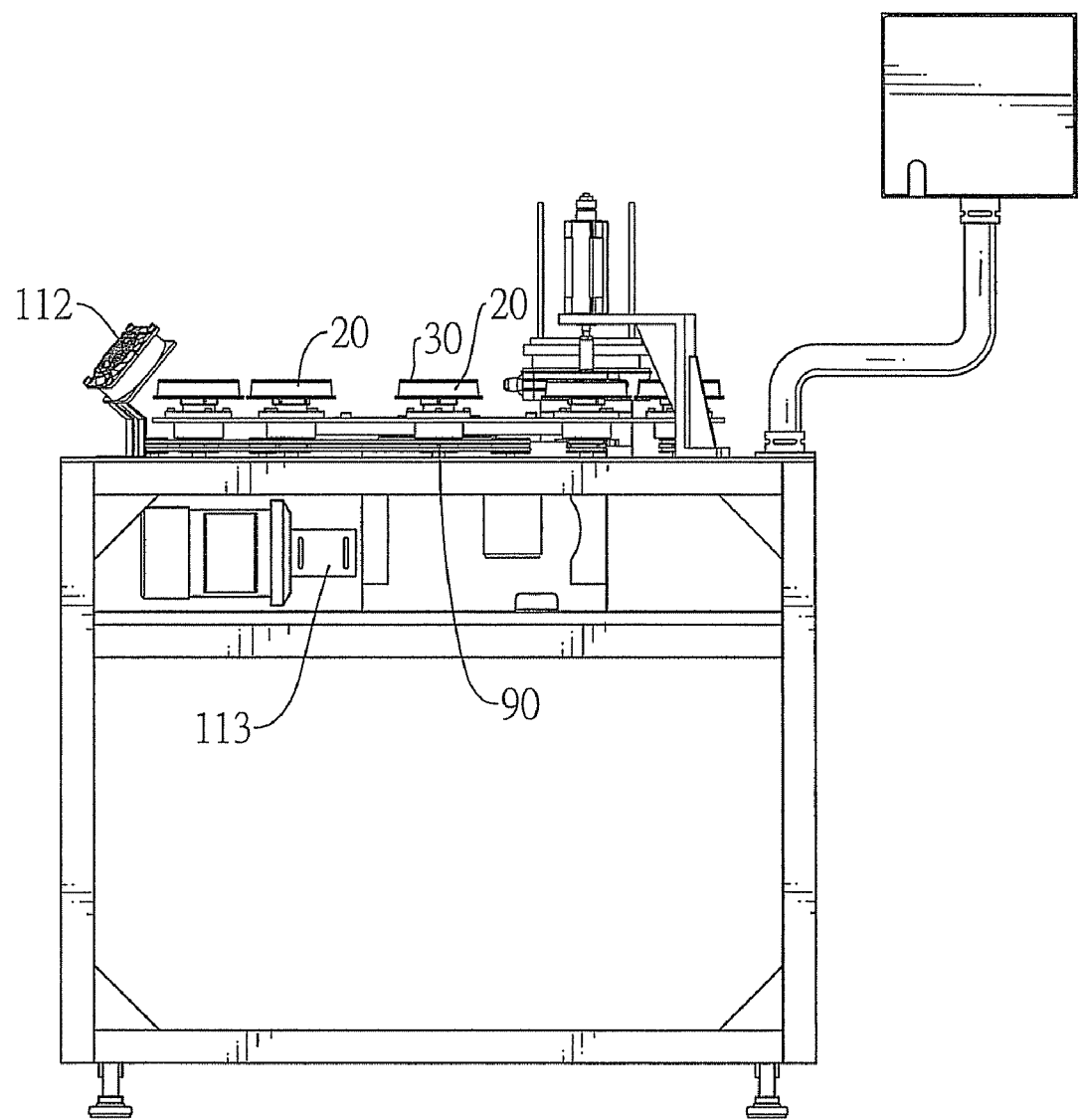
FIG. 2 is an operational side view of the pre-shape machine in FIG. 1.
Figure 3:
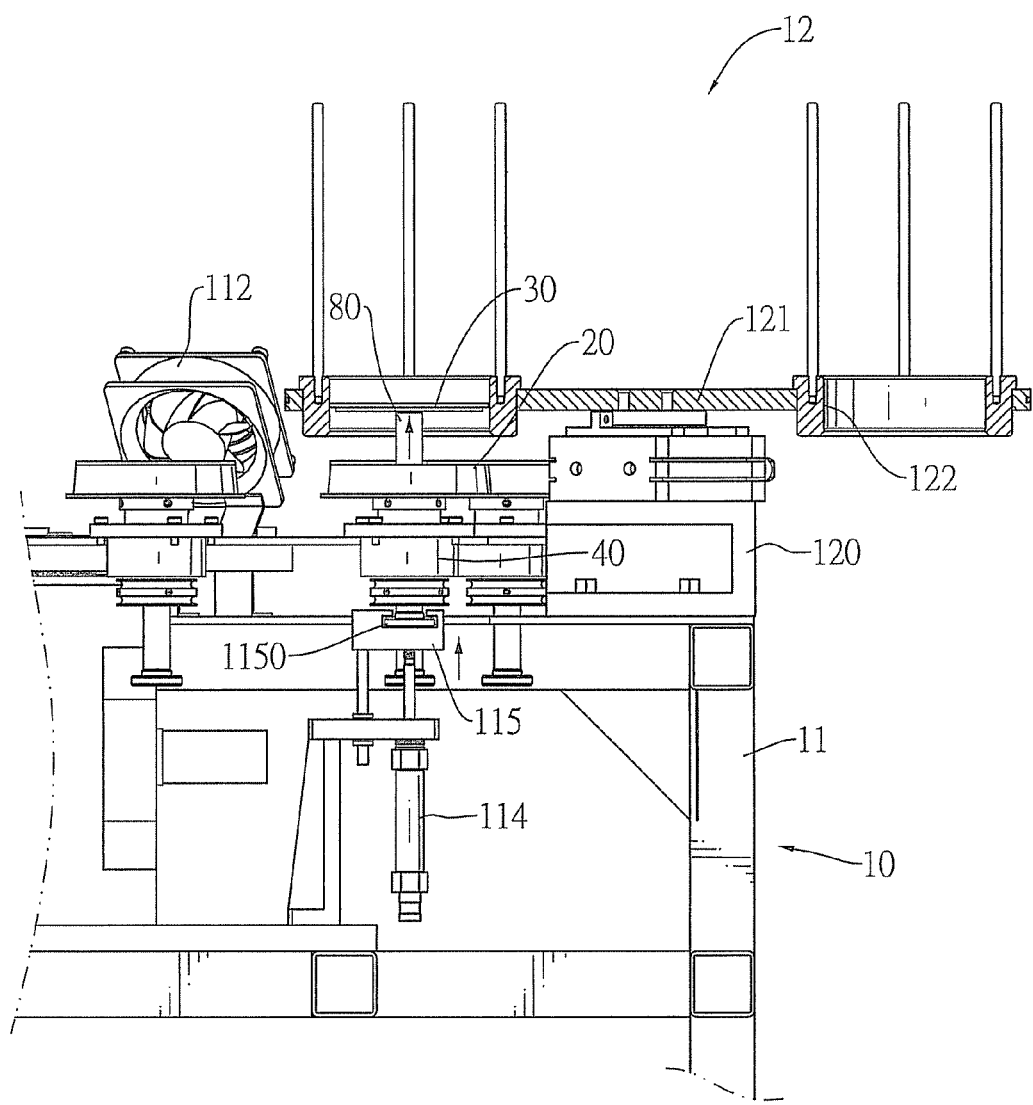
FIG. 3 is a partially enlarged side view of the molding device in FIG. 1.
Figure 4:
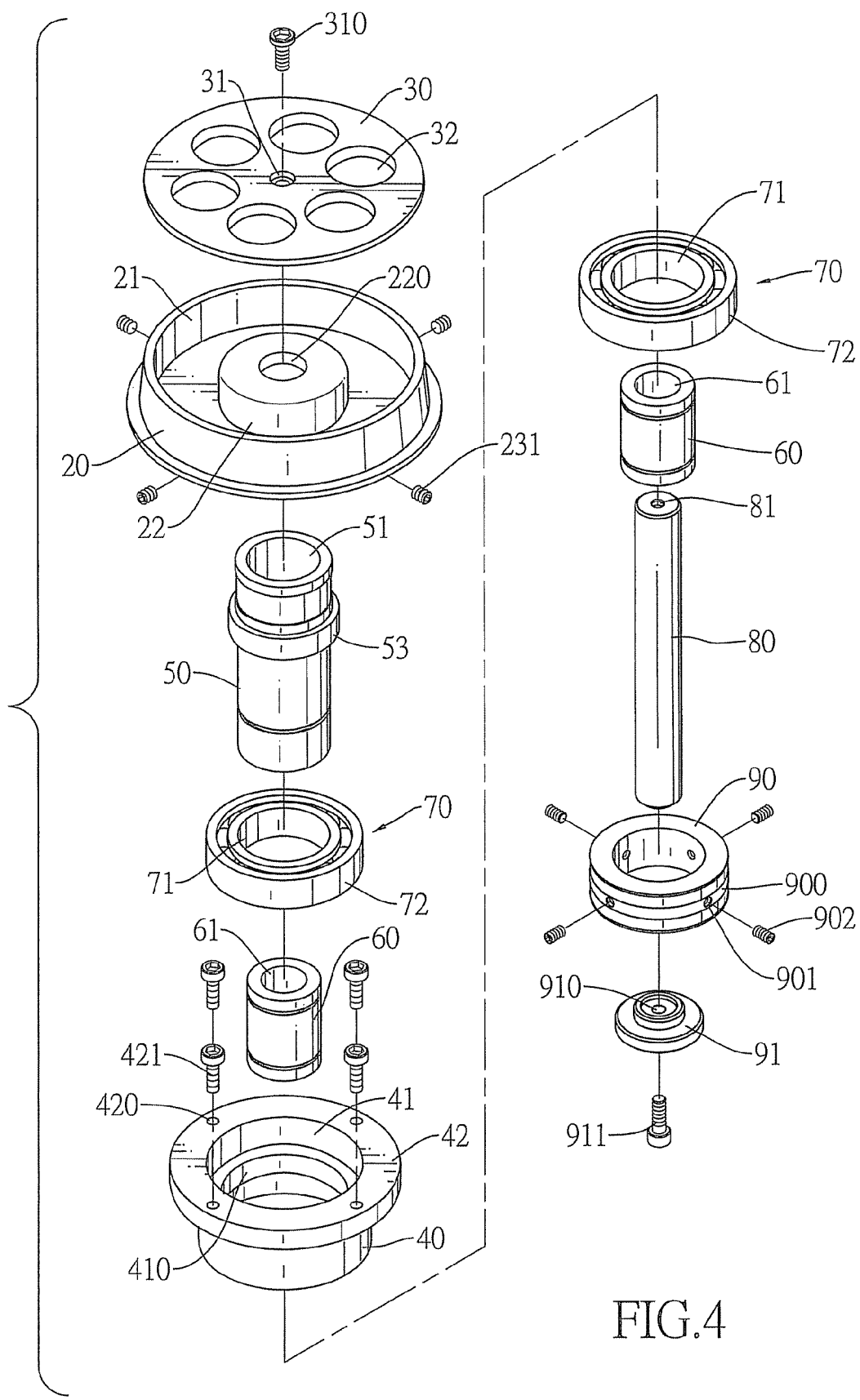
FIG. 4 is an exploded perspective view of the molding device in FIG. 1.
Figure 5:
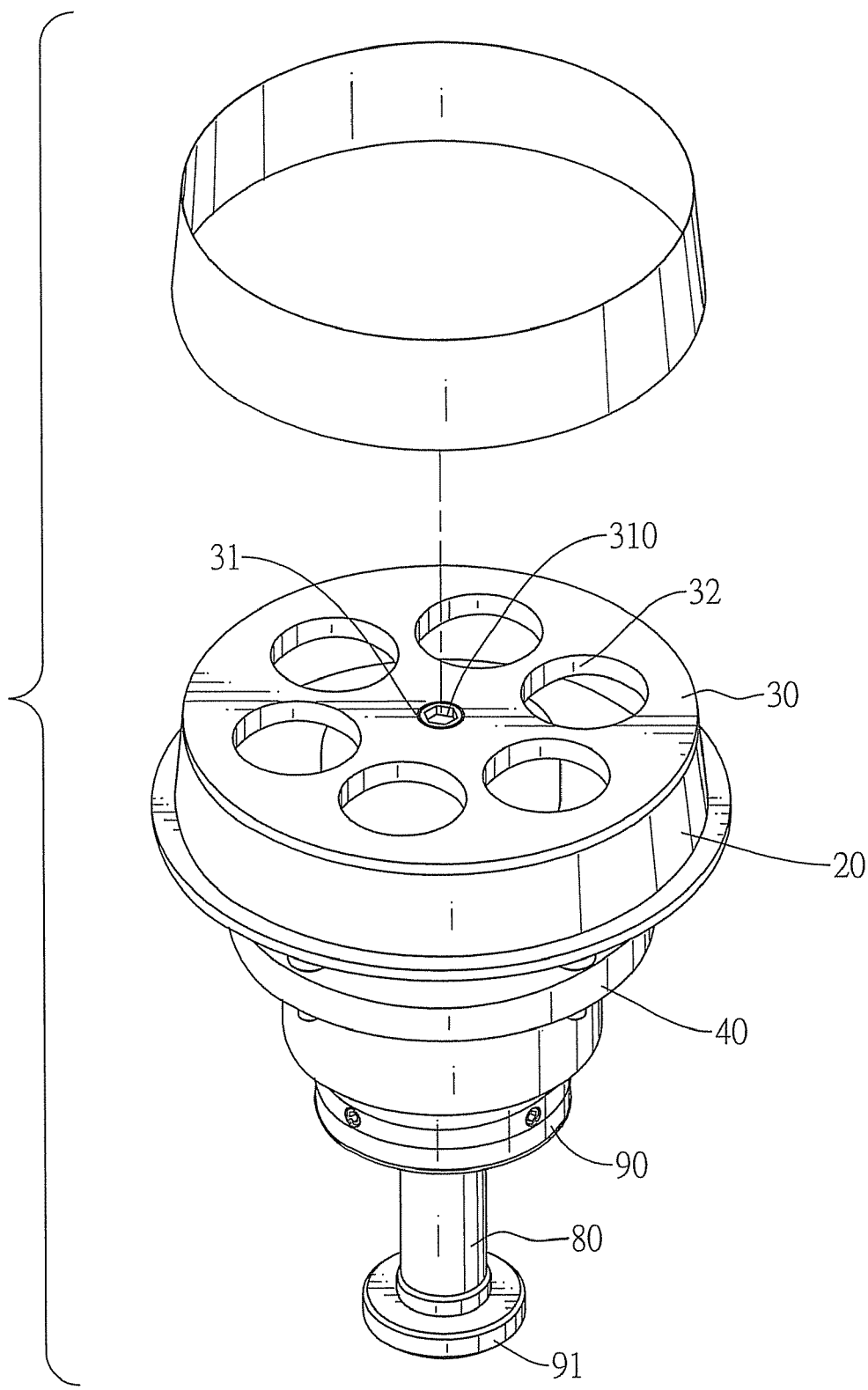
FIG. 5 is an operationally exploded perspective view of the molding device in FIG. 1.
Figure 6:
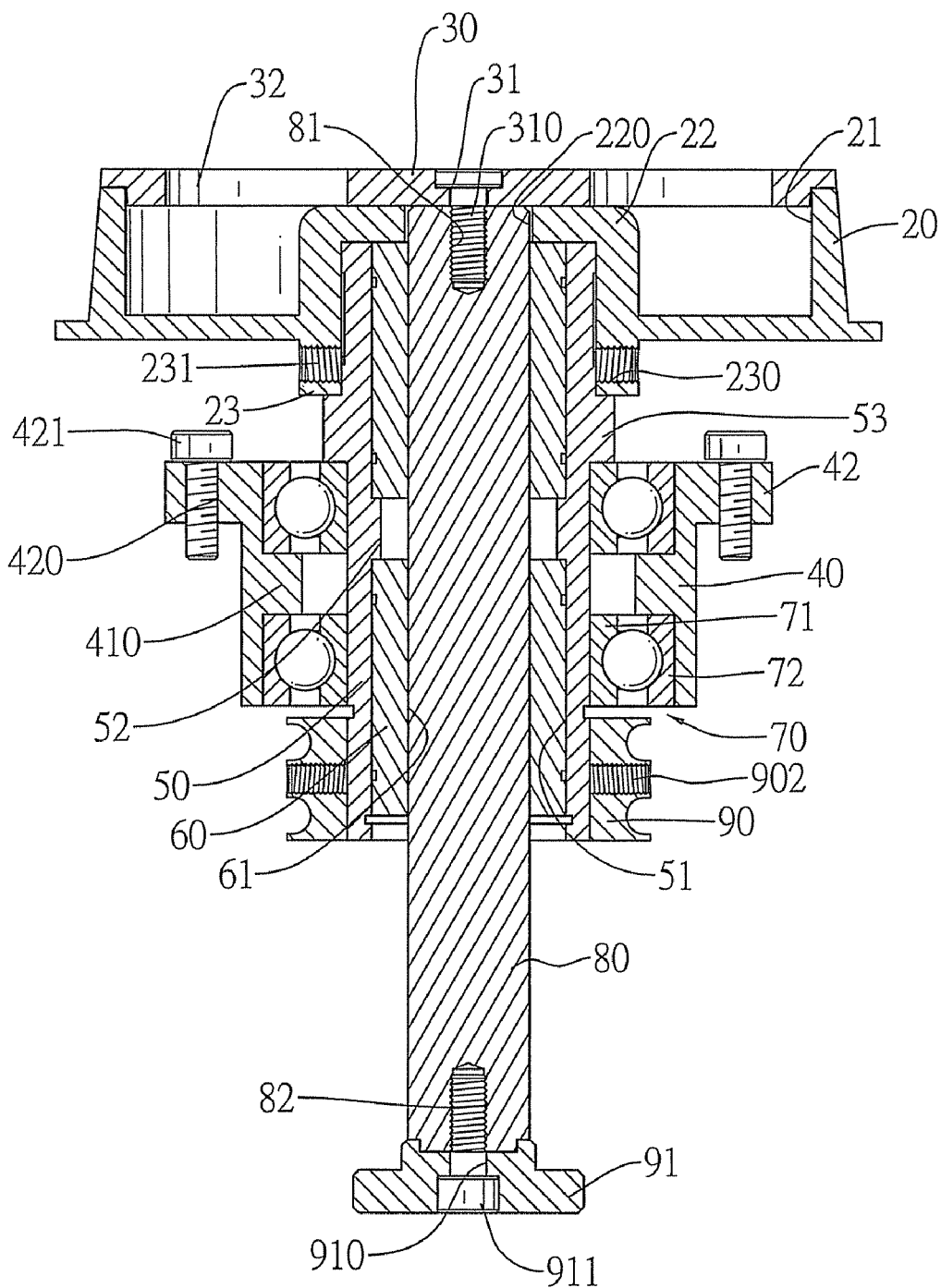
FIG. 6 is a side view in partial section of the molding device in FIG. 1.
Figure 7:
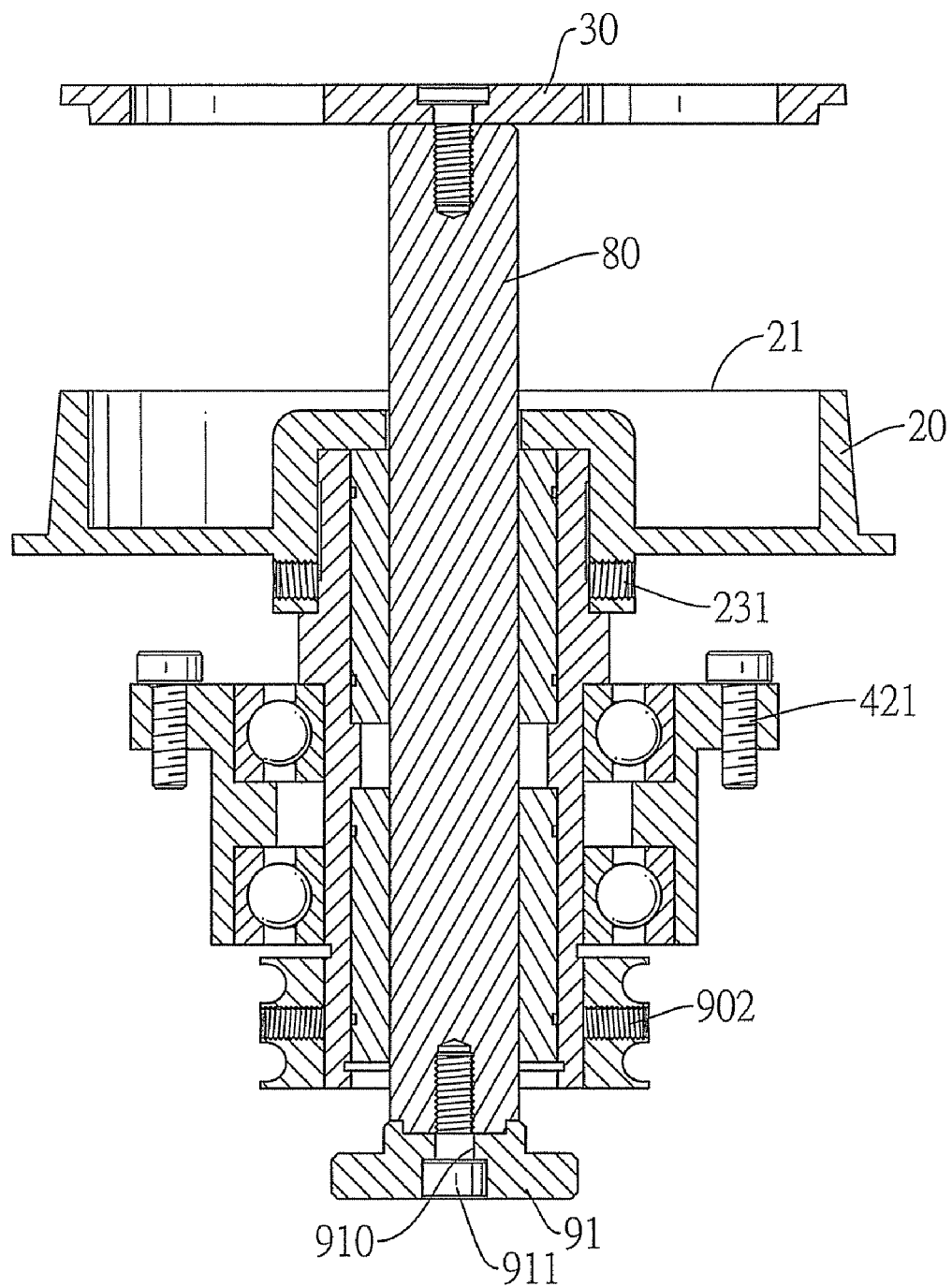
FIG. 7 is an operational side view in partial section of the molding device in FIG. 1.

With reference to FIGS. 1, 2 and 3, a pre-shape machine (10) comprises a base (11), a gathering device (12) and multiple molding devices in accordance with present invention.

The base (11) is installed with a power supplier and has a top surface, a rotating table (110), a hot air generator (111), multiple fans (112) a driving motor (113) and a cylinder (114). The rotating table (110) is mounted rotatably on the top surface of the base (11), rotated by the power supplier and kept at specific angular positions in a determined period of time. The hot air generator (111) is mounted adjacent to the rotating table (110) and has multiple nozzles corresponding to and spraying hot air to the rotating table (110). The fans (112) are mounted on the top surface of the base (11) adjacent to the hot air generator (111) and the rotating table (110). The driving motor (113) is mounted in the base (11). The cylinder (114) is mounted securely in the base (11) and has an extendable shaft and a connector (115) mounted on an end of the shaft and defining a notch (1150).

The gathering device (12) is mounted on the top surface of the base (11) adjacent to the rotating table (110) and has a bracket (120) and a gathering arm (121). The bracket (120) has a connection portion rotated by a rotating motor. The gathering arm (121) is mounted securely on the connection portion of the bracket (120) and has two ends and two gathering holes (122) formed in the ends respectively.

With further reference to FIGS. 4, 5, 6 and 7, each molding device for pre-shaped plastic films in accordance with present invention comprises a body (20), a platform (30), a seat (40), a post (50), two bushings (60), a driving shaft (80) and an operative disk (90).

The body (20) has an annular side surface, a recess, a bottom, a top opening (21), a central lump (22) and a bottom wall (23). The top opening (21) is communicated with the recess. The central lump (22) is formed in the recess and has a central hole (220) formed through the lump (22). The bottom wall (23) is annular, protrudes from the bottom of the body (20) and has multiple threaded holes (230) formed transversely through the wall (23).

The platform (30) is detachably mounted in the top opening (21) of the body (20), is selectively aligned with one of the gathering holes (122) in the gathering arm (121) of the gathering device (12) and has a central hole (31), a fastener (310) and multiple through holes. The central hole (31) corresponds to the central hole (220) of the central lump (22), and the fastener (310) is mounted in the central hole (220). The through holes (32) are formed through the platform (30) around the central hole (31).

The seat (40) has a top, a mounting space (41), a mounting flange (42), a partition (410) and two bearings (70). The mounting space (41) is formed through the seat (40) and defines an inner surface. The mounting flange (42) radially protrudes from the top of the seat (40) and has multiple fixing holes for extension of fixing element (310) to mount the seat (40) securely on the rotating table (110). The partition (410) diametrically protrudes from the inner surface of the mounting space (41) of the seat (40). The bearings (70) are mounted securely in the mounting space (41) and are disposed respectively in two sides of the partition (410).

The post (50) is mounted through the bearings (70) in the mounting space (41) of the seat (40) to rotate relative to the seat (40) smoothly and has a top end, a center, an outer surface, a bore (51) and a flange (53). The top end of the post (50) is mounted in the bottom wall (23) of the body (20). Multiple threaded bolts (231) extend through the threaded holes (230) in the bottom wall (23) and press against the top end of the post (50) to securely connect the post (50) to the body (20). The bore (51) is formed axially through the center of the post (50) and has an inner surface and an inner flange (52) formed diametrically around the inner surface of the bore (51). The flange (53) protrudes radially from the outer surface of the post (50) and abuts and supports the bottom wall (23) of the body (20).

The bushings (60) mounted securely in the bore (51) of the post (50), respectively abut against two sides of the inner flange (52) of the post (50) and have sliding holes (61) formed longitudinally through the bushings (60) and aligning with each other.

The driving shaft (80) is slidably mounted longitudinally through the sliding holes (61) of the bushings (60) and has a top end and a bottom end. The top end of the driving shaft (80) extends through the central hole (220) of the central lump (22) of the body (20) and has a securing hole (81) corresponding to the central hole (31) of the platform (30). A fixing element (310) extends through the central hole (31) and mounted into the securing hole (81) to mount the platform (30) on the top end of the driving shaft (80). The bottom end of the driving shaft (80) has an engaging disk (91) mounted securely thereon. The engaging disk (91) selectively engages the notch (1150) of the connector (115) mounted in an end of the shaft.

The operative disk (90) is mounted securely around the post (50) and defines a transmission groove (900) for mounting a transmission belt that is connected to the driving motor (113) of the base (11). Accordingly, the post (50) and the driving shaft (80) can be driven by the driving motor (113) to rotate.

During the pre-shaping process, plastic films are respectively mounted around the bodies (20) of the molding devices with top edges of the films protruding from the platform (30). When the plastic films are moved to correspond to the nozzles of the hot air generator (111) by the rotating table (110), the top edges are blown by hot air and formed into annular flanges around the top edges.

Figure 8:
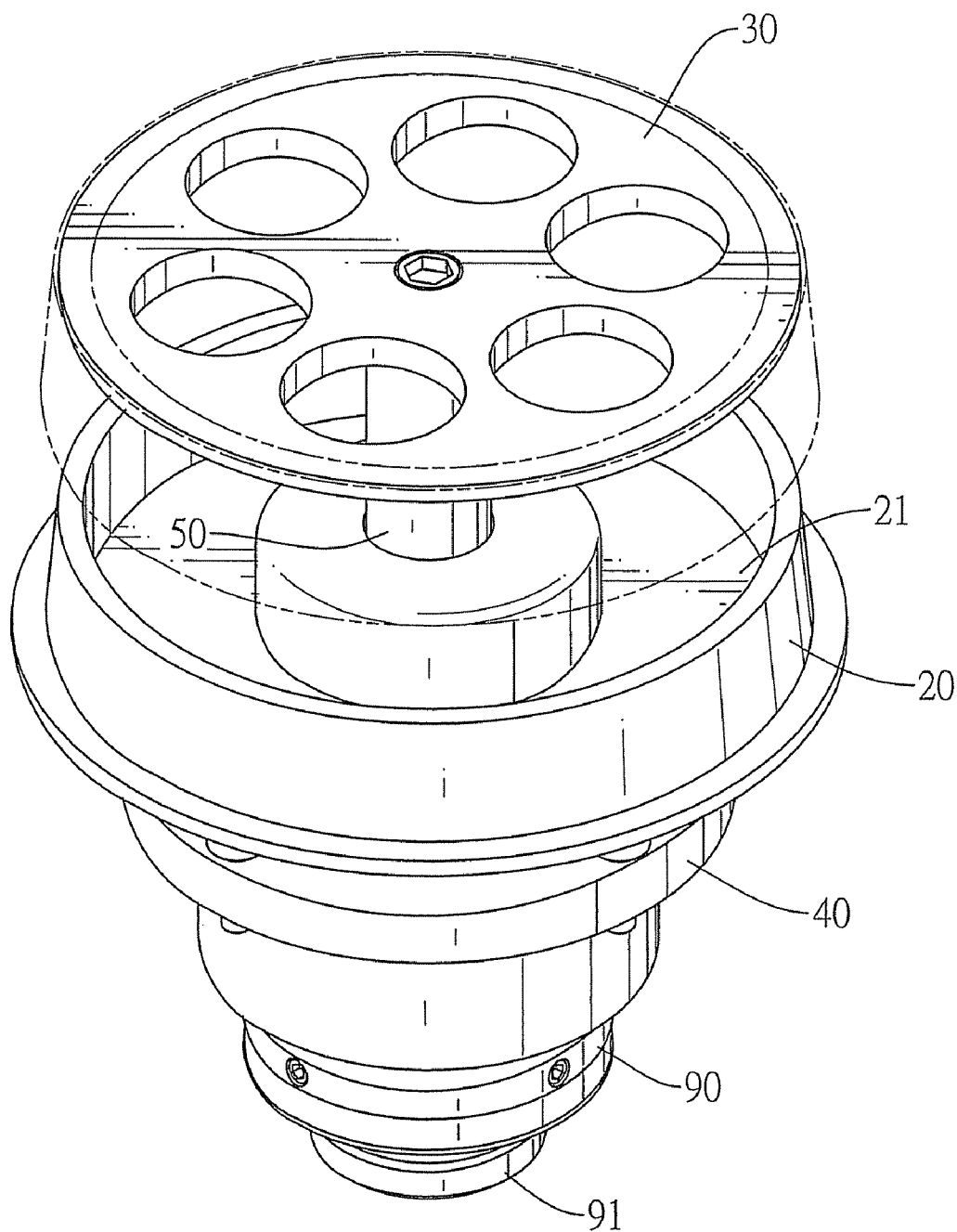
FIG. 8 is an operational perspective view of the molding device in FIG. 1.
Figure 9:
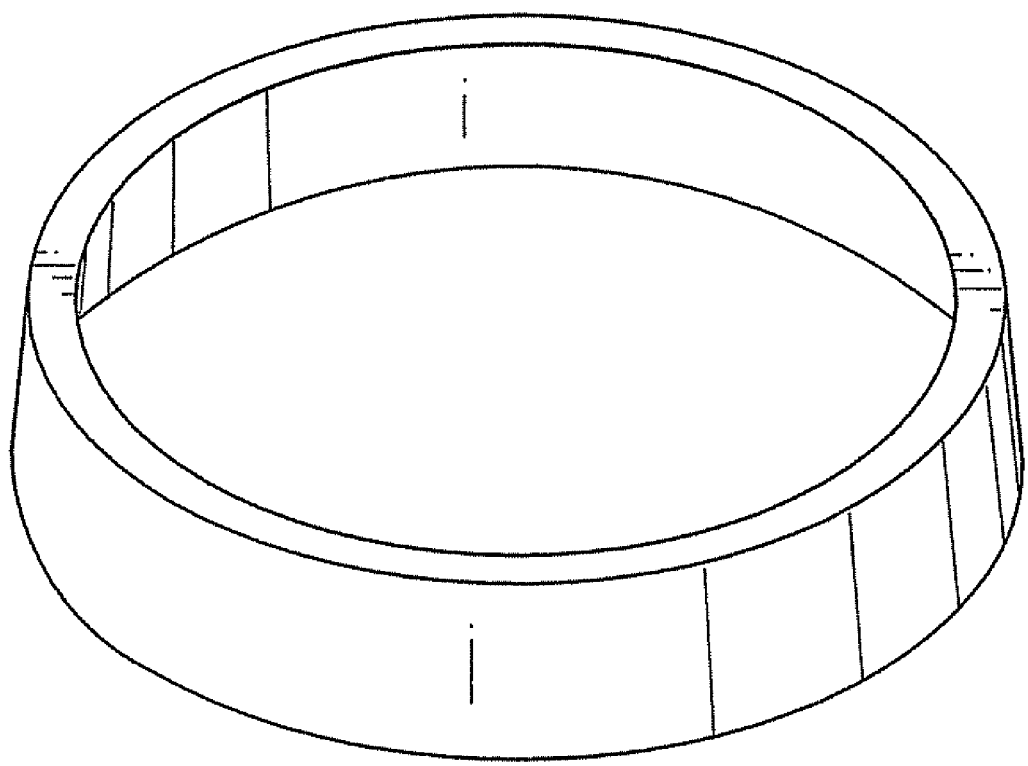
FIG. 9 is a perspective view of a pre-shaped plastic film.

With further reference to FIG. 8, the engaging disks (91) of the molding devices sequentially engage the notch (1150) of the connector (115) and the platforms (30) is raised by the operation of the shaft of the cylinder (114) through the transmission of the driving shaft (80). Consequently, the plastic film is lifted and removed from the body (20), and the plastic films can be gathered in one of the gathering holes (122) of the gathering device (12).

Accordingly, to manually separate the plastic films from the molding devices is unnecessary, so that the plastic film will not be damaged and the pre-shaping process is accelerated.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A molding device for pre-shaped plastic films comprising
 a body having an annular side surface and a top opening;
 a platform being detachably mounted in the top opening of the body; and
 a driving shaft being mounted longitudinally through the body, movably extending longitudinally relative to the body and having an end attached securely to the platform to selectively raise the platform, wherein
the body further has
 a recess;
 a bottom;
 a central lump being formed in the recess and having a central hole formed through the central lump; and
 a bottom wall protruding from the bottom of the body and having multiple threaded holes formed transversely through the bottom wall;
the platform further has
 a central hole corresponding to the central hole of the central lump; and
 a fastener mounted in the central hole of the platform; and
the molding device further comprises
 a seat having
  a top;
  a mounting space being formed through the seat and defining an inner surface;
  a mounting flange radially protruding from the top of the seat and having multiple fixing holes for extension of multiple fixing elements; and
  two bearings being mounted securely in the mounting space;
 a post being mounted through the bearings in the mounting space of the seat to rotate relative to the seat and having
  a top end being mounted in the bottom wall of the body, and multiple threaded bolts extending through the threaded holes in the bottom wall and pressing against the top end of the post to securely connect the post to the body;
  a center;
  an outer surface;
  a bore being formed axially through the center of the post and having an inner surface; and
  a flange protruding radially from the outer surface of the post;
 two bushings mounted securely in the bore of the post, and each bushing having a sliding hole formed longitudinally through the bushing and aligning with each other,
wherein the driving shaft is slidably mounted longitudinally through the sliding holes of the bushings and has a bottom end and a top end extending through the central hole of the central lump of the body and having a securing hole corresponding to the central hole of the platform and a fixing element extends through the through hole and mounted into the securing hole to mount the platform on the top end of the driving shaft.

2. The molding device as claimed in claim 1, wherein the seat further has a partition diametrically protruding from the inner surface of the mounting space of the seat; and the bearings are disposed in two sides of the partition.

3. The molding device as claimed in claim 1, wherein the bore of the post further has an inner flange formed diametrically around the inner surface of the bore; and the bushings respectively abut against two sides of the inner flange of the post.

4. The molding device as claimed in claim 1, wherein the platform further has multiple through holes formed through the platform around the central hole.

5. The molding device as claimed in claim 1 further having an operative disk being mounted securely around the post and defining a transmission groove.

6. The molding device as claimed in claim 1, wherein the bottom end of the driving shaft has an engaging disk mounted securely on the driving shaft.

* * * * *